(12) United States Patent
Åberg et al.

(10) Patent No.: US 12,292,733 B2
(45) Date of Patent: May 6, 2025

(54) LATENCY MANAGEMENT

(71) Applicant: Telefonaktiebolaget LM Ericsson (publ), Stockholm (SE)

(72) Inventors: Patrik Åberg, Södra Sandby (SE); Stefan Runeson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 766 days.

(21) Appl. No.: 17/517,003

(22) Filed: Nov. 2, 2021

(65) Prior Publication Data

US 2022/0057781 A1 Feb. 24, 2022

Related U.S. Application Data

(63) Continuation of application No. 16/771,286, filed as application No. PCT/EP2017/082457 on Dec. 12, 2017, now abandoned.

(51) Int. Cl.
*G05B 19/418* (2006.01)
*H04W 56/00* (2009.01)

(52) U.S. Cl.
CPC .... *G05B 19/4186* (2013.01); *H04W 56/0045* (2013.01); *G05B 2219/31162* (2013.01); *G05B 2219/31213* (2013.01); *G05B 2219/31218* (2013.01); *G05B 2219/31261* (2013.01)

(58) Field of Classification Search
None
See application file for complete search history.

(56) References Cited

U.S. PATENT DOCUMENTS

| | | | |
|---|---|---|---|
| 5,317,571 A | 5/1994 | Marcel et al. | |
| 6,531,974 B1* | 3/2003 | Callahan | H03K 5/131 341/120 |
| 8,391,814 B2* | 3/2013 | Shute | H03G 3/3042 455/127.2 |
| 2004/0143370 A1 | 7/2004 | Lu et al. | |
| 2004/0201710 A1 | 10/2004 | Uchihashi et al. | |
| 2004/0242155 A1* | 12/2004 | Spiridon | H04B 1/719 455/23 |
| 2005/0109395 A1* | 5/2005 | Seberger | G05B 9/02 137/8 |
| 2005/0285642 A1* | 12/2005 | Rashid | H03L 7/0814 327/158 |
| 2007/0262724 A1* | 11/2007 | Mednik | H05B 45/48 315/125 |

(Continued)

FOREIGN PATENT DOCUMENTS

JP 2017126824 A 7/2017

*Primary Examiner* — Wutchung Chu
*Assistant Examiner* — Berhanu D Belete
(74) *Attorney, Agent, or Firm* — Murphy, Bilak & Homiller, PLLC

(57) ABSTRACT

A method for use in an automated wireless industrial system comprising a device configured to act as a control node and at least one field level device, wherein the method comprises: issuing a control communication; inserting at least one time delay (tk) to the control communication; noting the communication time (TCL) for the communication; comparing the time for communication (TCL) to an expected time for communication (TR); and determining if any of the at least one time delay (tk) should be adapted, and if so, adapting at least that time delay.

18 Claims, 3 Drawing Sheets

(56) References Cited

U.S. PATENT DOCUMENTS

| | | | |
|---|---|---|---|
| 2008/0039128 A1* | 2/2008 | Ostman | H04W 52/22 455/522 |
| 2008/0122414 A1* | 5/2008 | Solyom | G05F 1/14 323/247 |
| 2009/0043407 A1* | 2/2009 | Mathiesen | G05B 19/4185 700/51 |
| 2009/0156143 A1* | 6/2009 | Shute | H03G 3/3042 455/127.1 |
| 2010/0283520 A1* | 11/2010 | Ku | H03L 7/0814 327/158 |
| 2011/0016362 A1* | 1/2011 | Holzaepfel | H04L 43/50 714/51 |
| 2011/0118855 A1* | 5/2011 | Hosek | G05B 19/4185 700/29 |
| 2012/0079851 A1 | 4/2012 | Heath et al. | |
| 2013/0300463 A1* | 11/2013 | Gemmeke | G06F 1/3296 716/108 |
| 2015/0378356 A1* | 12/2015 | Hefeeda | G05B 19/4185 700/9 |
| 2016/0164793 A1* | 6/2016 | Basu Mallick | H04W 28/0908 370/235 |
| 2020/0204282 A1* | 6/2020 | Rempel | H04W 28/0236 |

* cited by examiner

LATENCY MANAGEMENT

RELATED APPLICATIONS

This application is a continuation of U.S. application Ser. No. 16/771,286 filed 10 Jun. 2020, which is a U.S. National Phase Application of PCT/EP2017/082457 filed 12 Dec. 2017. The entire contents of each aforementioned application is incorporated herein by reference.

TECHNICAL FIELD

This application relates to a wireless communications device, a method and a computer-readable storage medium for improved latency management, and in particular to a wireless communications device, a method and a computer-readable storage medium for improved latency management in automated wireless industrial communication.

BACKGROUND

More and more industries are becoming automated, and the industrial automation architecture is often referred to as the automation pyramid, basically having three levels. The top level is the management level, where Manufacturing Execution Systems (MES) resides. MES manages among other things resource allocation, operations scheduling, product tracking and maintenance management.

Below the management level is the automation level, where there are control systems like Programmable Logic Controllers (PLC), Distributed Control Systems (DCS), supervisory systems such as Supervisory Control And Data Acquisition (SCADA) systems and Human Machine interfaces (HMI). PLC systems are used for manufacturing automation. DCS systems are used for process automation. SCADA systems are used for centralized supervision. HMIs are used for enabling local supervision and control.

Below the automation layer is the field layer having the actual sensors and actuators which provide access to, for controlling and/or for sensing/reading, the physical processes.

The layers communicate with one another through commands and data points, such as for reading sensor values, executing actuator commands and retrieving status information.

The communication techniques used between the various layers differ widely from system to system, but generally the higher up in the pyramid, the higher the abstraction level of the communication standard being used. For example, communication with the Management layer is usually through IP (Internet Protocol) communication. Communication with the Automation layer is usually through Ethernet communication protocols and the Field layers traditionally use various fieldbuses.

In the automation industry, there are strict requirements on the communication latency, not only on the average, but especially for the maximum latency tolerable. As the automation is designed to monitor and/or control various physical processes, there is of course requirements that some monitoring/control steps do not take too much time, such as longer than the corresponding physical process requires. In such case, the automation will be doomed to fail.

As wireless communication grows in popularity also for the automated industry many of these field buses are being replaced by wireless technologies such as Wi-Fi. ZigBee, Bluetooth, WirelessHART (based on IEEE 802.15.4), ISA100.11a (based on IEEE 802.15.4) and different cellular technologies such as Long term Evolution (LTE) and Global Systeme Mobile (GSM).

As is known, wireless communication is exposed to a much wider range of interference and disturbance, and as a shared physical channel (the spectrum between different frequencies) is shared, the speed of communication also varies with the actual deployment. This is one of the major reasons why automating using wireless systems is so difficult. It is nearly impossible to predict how the system will behave in all environments, how it will be affected by changes and how it may be scaled. For example, a truck carrying a load of metal parts driving in to a factory, will impact the radio frequency environment of the factory to a large extent, possible interfering with the devices at the field level of the automation process causing a delay or increase in latency that may be unacceptable.

In view of the problems and shortcomings indicated above, there is a need for an improved manner of managing the latency in automated wireless industrial processes so that such increases in latencies is avoided.

SUMMARY

It is therefore an object of the teachings of this application to overcome or at least mitigate one or more of the problems and shortcomings listed above and below by providing a method for use in an automated wireless industrial system comprising a device configured to act as a control node and at least one field level device, wherein the method comprises: issuing a control communication; inserting at least one time delay (tk) to the control communication; noting the communication time (TCL) for the communication; comparing the time for communication (TCL) to an expected time for communication (TR); and determining if any of the at least one time delay (tk) should be adapted, and if so, adapting at least that time delay.

It is also an object of the teachings of this application to overcome or at least mitigate one or more of the problems and shortcomings listed above and below by providing a device comprising a processor arrangement and a wireless interface, wherein said processor arrangement is configured to act as a control node by: issuing a control communication to which at least one of time delay (tk) is inserted; noting the communication time (TCL) for the communication; comparing the time for communication (TCL) to an expected time for communication (TR); and determining if any of the at least one of time delay (tk) should be adapted, and if so, adapting at least that time delay.

In one embodiment, the device is configured for use in a wireless industrial system.

It is moreover an object of the teachings of this application to overcome one or more of the problems and shortcomings listed above by providing a computer readable storage medium encoded with instructions that, when executed on a processor, perform the method referred to above.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
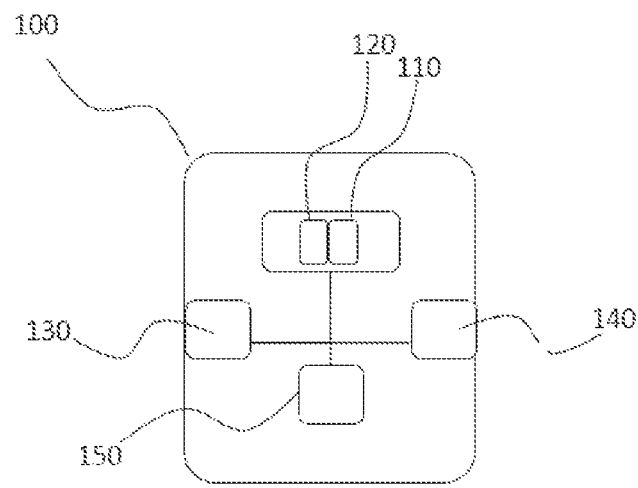
FIG. 1 shows a schematic overview of the components of a wireless communications device according to one embodiment of the teachings of this application.

FIG. 1 shows a schematic overview of a wireless communications device 100 or User Equipment (UE) according to one embodiment of the present invention. The UE may be a robotic tool, an actuator, a sensor or other automated industrial device.

The UE 100 comprises a processor arrangement 110 which is configured to control the overall functionality and also specific functions of the UE 100 such as by executing computer program instructions loaded into or stored on a memory 120 connected to or being part of the processor arrangement 110. The processor arrangement 110 may comprise one or more processors or other logic programmable circuits for combined or individual execution of a task or application. However, for the purpose of this application they will be seen as being the one and same processor arrangement 110. The processor arrangement 110 is connected to or comprising the memory 120 for storing computer instructions and also data to be processed by the computer instructions when executed by the processor arrangement 110. The memory 120 may comprise one or several memory circuits, possibly arranged in a hierarchy. One or more of such memory circuits may be comprised in the processor arrangement 110. For the purpose of this application the memory circuits will be regarded as one memory 120.

The processor arrangement 110 may also connected to a Human Machine Interface 130 for receiving input from a user and for presenting data or other information to the user.

The processor arrangement 110 is also connected to a communications interface 140, such as a Radio frequency interface. The RF interface 140 may be configured to operate according to a long range standard, such as a cellular network standard GSM, LTE or a 5G standard. The RF interface may alternatively or additionally be configured to operate according to a short range standard, such as a Bluetooth®, IEEE802.11b (WiFi™), IEEE802.16, ZigBeer™, WirelessHART (based on IEEE 802.15.4), ISA100.11a (based on IEEE 802.15.4) or NFC™ (Near Field Communication) standard.

The communications interface 140 enables a UE 100 to communicate with other devices, for example in the automation layer.

The UE may also comprise a power source 150, such as a battery or a power feed.

Figure 2:
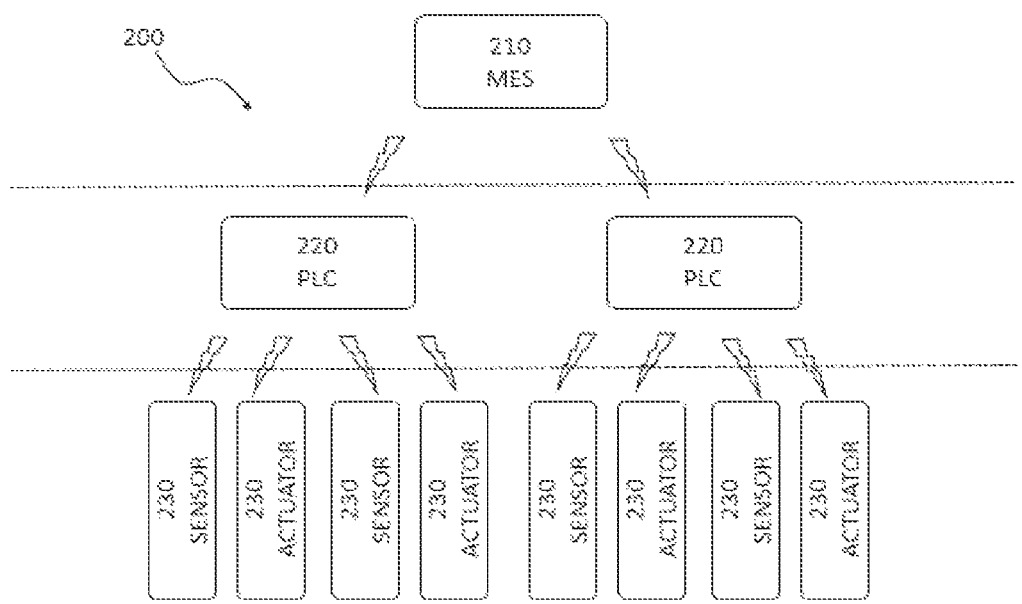
FIG. 2 shows a schematic overview of an automated wireless system in which an wireless communication device according to FIG. 1 is utilized according to one embodiment of the teachings of this application.

FIG. 2 shows an example of a communication system 200 used for automated wireless industry. The levels of the automation pyramid are shown demarcated by dotted lines.

In the MES layer there is a device 210 implementing a MES. The MES device 210 is wirelessly communicating with at least one device 220 in the automation layer, such as a PLC. The PLC device 220 is in turn communicating with one or several devices 230 in the field layer, such as sensors or actuators. For the purpose of this application, no difference will be made between the various field devices, or the automation or management devices. As would be apparent to a skilled person, which device is actually connected to which device is highly dependent on the context of the process being automated and may vary widely. Also, a device may be executing in two or more layers simultaneously, having different software or hardware modules handling various tasks, possibly in different layers of the automation architecture model.

Figure 3:
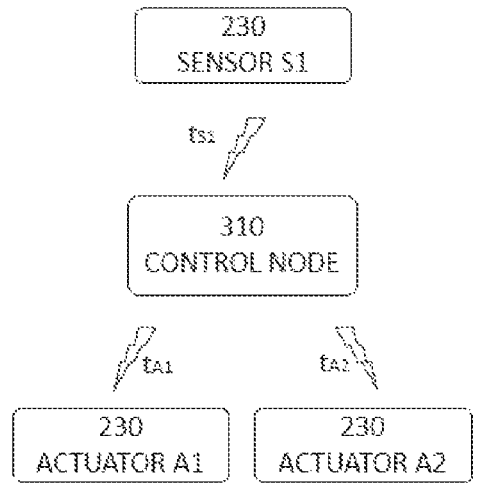
FIG. 3 shows a schematic view of an automated industry process system according to one embodiment of the teachings of this application.

FIG. 3 shows a different schematic view of the automated industry process system 200 of FIG. 2, where a controller loop module is arranged to be implemented by a processor arrangement 110 of a device 100. The device 100 may be a device in the management layer (210) or in the automation layer (220), or even in the field layer (230). The device 100 may even be a base station.

The control node 310 is arranged to communicate with one or more field devices 230 (such as sensors and/or actuators). The time $t_i$ for communicating with a field device i corresponds to a first transmission time $t_{iT}$ (for transmitting (T) a request to the field device i), a process time $t_p$, and a reception time $t_{iR}$ (for receiving (R) the response from the field device i). Expressed as a formula:

$$t_i = t_{iT} + t_{iP} + t_{iR}.$$

The control node may be arranged to perform a control loop of the associated field devices to ensure that the system it represents is acting according or performing to its requirements. For example, if an example system is set up so as to receive input from a sensor (after prompting) and then commanding for example two actuators to perform each a task, the total time this control loop would take TCL equals the time to prompt the sensor plus the time to execute the two actuators' tasks, that is the longer of the time to execute each of these two tasks.

For the example of FIG. 3, where the control node 310 performs a control loop on the sensor S1 and the actuators A1 and A2 we get that the time for the control loop TCL equals:

$$TCL = t_{S1} + MAX(t_{A1}; t_{A2}) => TCL = t_{S1T} + t_{1P} + t_{S1R} + MAX(t_{A1T} + t_{A1P} + t_{A1R}; t_{A2T} + t_{A2P} + t_{A2R})$$

Assuming the processing time is negligent compared to the transmission/reception time, or possibly indistinguishable from the transmission/reception times (such as the processing time being unknown), we get:

$$TCL = t_{S1T} + t_{S1R} + MAX(t_{A1T} + t_{A1R}; t_{A2T} + t_{A2R}).$$

For maintaining a stable process, it is imperative that the time of such a control loop falls under the time requirements TR for the process.

The inventors have realized that by adding a variable time delay to each transmission and possibly to each reception (the reception being a transmission in the opposite direction), the latency of the control system may become more stable, more predictable and more manageable. The time delay may be added or inserted in to the communication by halting a communication interface and/or a processor arrangement's execution of the relevant instructions for a time equalling the time delay. By varying the delay and measuring how the time for a control loop matches the requirements (and setting the requirements to slightly less than the absolute maximum time requirement), the latency of the system may be managed by adjusting the delay to a lower value, if the total time for a control loop exceeds the requirement, and by adjusting the delay to a higher value, if the total time for a control loop does not exceed the requirement. The requirement may be the actual timelimit after which the system may start to experience timing errors, or the requirement may be a (safer) threshold level, where the risk of timing errors is lower, and at which the system is more likely to operate without difficulties.

By adding such a variable, air space is also introduced into the system enabling a time sharing of a channel.

Figure 4:
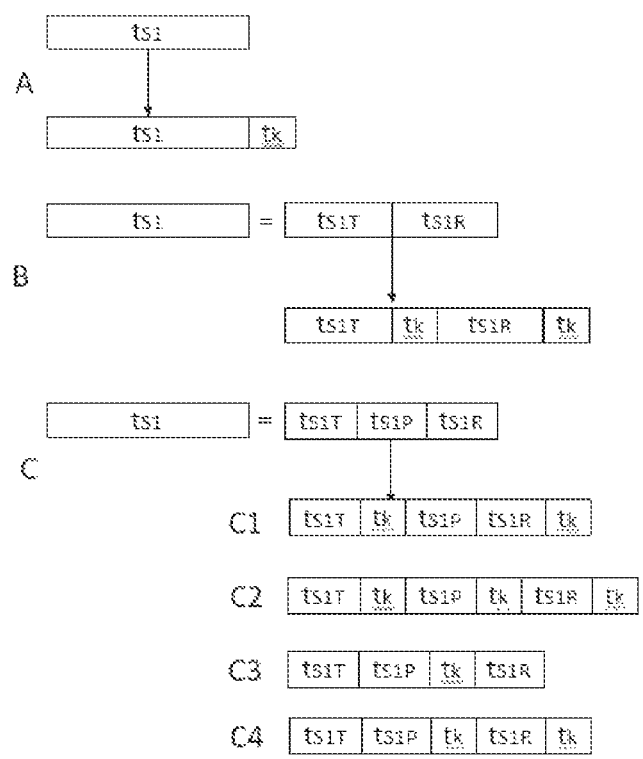
FIG. 4 shows a flowchart for a general method of controlling a telecommunications device according to the teachings herein.

FIG. 4 shows a schematic view of how the time delays tk may be added to the communication times, exemplified by the communication time for sensor S1. In FIG. 4, three main scenarios are shown: A) when the delay is simply added to the total time for sensor S1; B) when the communication time is seen as the sum of the transmission time and the reception time and a delay is added to each of these; and C) when the communication time is seen as involving a processing time, and a delay is added to the transmission time, the reception time and/or to the processing time.

Depending on which component that is used to add the delay, one or several of the scenarios of FIG. 4 may be used. For example, if it is the receiving control node that adds the delay tk, then scenario A) is most likely the best option to use, where a simple delay is added upon reception of the response to a query $T = t_{S1} + tk$, where T is the time from transmission to reception, and tk is the time delay.

In another example, where the communication interfaces of respective devices included in the control loop (sensors, actuators . . . ) are adding the delays, scenario B is most likely the best option to use where a simple delay may be added either upon each transmission of a data package, and/or upon reception of a data package, where $T = t_{S1} = t_{S1T} + tk + t_{S1R} + tk$.

In another example, where the processor arrangements 110 are adding the delays, one possibility is where a delay is also added by the processor arrangement 110 of the field device to the processing time. This may be done in addition to the delays added to the transmission times, shown in scenario C2, or as an alternative, shown in scenario C3. Another possibility is where both processor arrangements 110 (the processor arrangement 110 of the field device, and the processor arrangement 110 of the control node) add a delay as shown in scenario C4. Other possibilities are to only add the time delay to the transmission time or to only add the time delay to the reception time.

It should be noted that although the delays are shown as being one delay tk, they may differ. For example, the time delay added to the transmission time may be different from the time delay added to the reception time.

As a skilled person would realize, the overall effect of which scenario is used may vary on the given implementation and in some cases a combination of several scenarios may be used for different and/or for the same control nodes.

By adding the delay tk at various points in the control loop. i.e. at different times, opens up airspace at different time for time sharing of the channel.

It should also be noted that the time delays to be added at different points do not need to be the same, even though illustrated as such in the figures.

In the following the description will focus on scenario A) where a delay (possibly representing a total delay) is added to regulate the communication time to substantially equal the required time TR.

The control node thus performs a control loop and notes the time for the control loop TCL. This may be done regularly, such as every 1 second, every ⅒ seconds, or every ¹⁄₁₀₀ seconds. The control loop may also be checked regularly or continuously by simply monitoring the communication times with the field devices. It may also be done if a disturbance is detected. Such a disturbance may be detected through a delay or change in response times. Usually such a delay or change in response times would be rather sudden, unlike a gradual change over time.

Starting with a default time delay, the time for a control loop (TCL) is measured. The default time delay is in one embodiment 0 seconds, i.e. the control loop time is measured without any delays added. In one embodiment the default time delay is greater from 0 seconds, enabling a designer to implement a system, that based on experience or simulations usually end up having a time delay larger than 0 thereby enabling for a faster adaptation of the system.

If the time for the control loop is lower than the time requirement (TCL<TR) the time delay is adjusted to a higher value. If the time for the control loop is higher than the time requirement (TCL>TR) the time delay is adjusted to a lower value.

The time delay to be added (or expressed differently, the difference between an actual transmission time and an expected or wanted transmission time) may be seen as a measurement of how "healthy" (i.e. free of disturbances and interference) the radio frequency environment is, where a long or high time delay indicates a low level of interferences, and where a high level of interferences will lead to a short time delay. The time delay may also be seen as a measurement of how loaded the communication system is, where a long or high time delay indicates a low total load, and where a high total load will lead to a short time delay.

In one embodiment the processor arrangement 110 of the device 100 may be configured to monitor the latency of the automated process to ensure that it is running smoothly and as expected, by adapting the delay and therefore also the expected response times.

In one embodiment the processor arrangement 110 of the device 100 may be configured to determine that the radio frequency environment and/or load on the communication system is such that fast and critical systems may not be able to operate correctly, and thereby adapt them (increase their expected and/or required communication times) or perform a graceful shutdown before any system crash can occur. A time delay tk falling below a threshold value may be used as an indicator of a bad environment and/or a high load that is high or reaching a threshold level.

In one embodiment, the rate of change of the time delay to be added may be used as an indicator. A rapidly falling (or decreasing) time delay may indicate a radio environment going bad and/or a high load that is rising or reaching a threshold level and indicate to the processor arrangement 110 to cause a shutdown of one or several systems so that they can be switched off gracefully before any crashes occur. The processor arrangement 110 may thus be configured to detect that the rate of change is above a first rate threshold, and cause a shutdown of at least one device.

A slowly changing time delay to be added may indicate that another communication parameter should or could be changed. The processor arrangement 110 may thus be configured to detect that the rate of change is below a second rate threshold, and adapt a parameter accordingly. One example is the factor by which the time delay is changed. Another parameter to be changed could be parameters of the communication channel used.

In one embodiment the processor arrangement 110 of the device 100 may be configured to determine that the radio frequency environment or communication load is such that more devices may be added or not. Such an embodiment may be useful for running dimension simulations or tests.

In one embodiment the time delay tk is changed to proportional to the difference between the time for the control loop and the expected time. In one such embodiment, the time to be added may be increased by a portion of the difference, for example 10%, 20%, 25%, 30%, 33%, 40%, 50%, 60%, 67%, 70% 75%, 80%, 90% or 95% of the difference.

Another example is where the time delay is changed in proportion to the difference, where a large difference gives a large change to enable a fast adaptation without surpassing the critical time restraints. For example the time delay is changed proportional to the quota of the time difference and the time delay or vice versa. So that if the time delay is large compared to the time difference, a small change is made. If the time delay is small compared to the time difference, a large change is made.

In one embodiment, the time delay is changed incrementally. In such an embodiment, a check may be performed to see if the resulting time delay would result in a communication time exceeding the time requirement and if so, signal a shutdown of a system or a warning.

It should be noted that, as several time delays may exist in one loop (confer for example scenarios B and C) the teachings herein include basing determinations on one, a subset or all of the time delays, and for adapting one, a subset or all of the time delays. Monitoring, comparing and/or adapting/changing a time delay, should thus be considered to include monitoring, comparing and/or adapting/changing at least one time delay.

Figure 5:
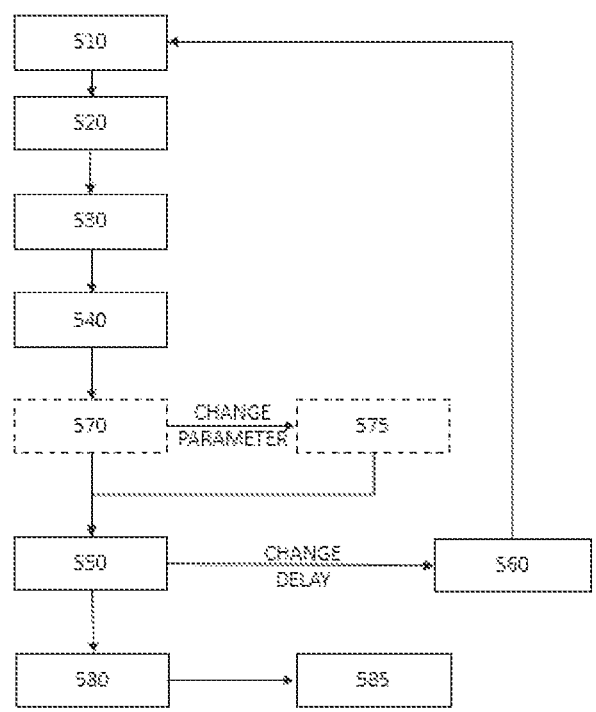
FIG. 5 shows a schematic view of an example haptic telecommunications device system according to one embodiment of the teachings of this application.

FIG. 5 shows a flowchart for a general method according to herein for managing the latency of an automated wireless industrial process such as in FIGS. 2 and 3.

A control loop (possibly being a test script or a proper communication) is issued 510 by a control node. At least one time delay (referred above to as tk) is added or inserted 520 to the time for the communication, by halting a communication interface and/or a processor arrangement's execution of the relevant instructions for a time equalling the time delay. As the control loop is received, the time for the communication (including the time delay) is noted or determined 530. The time for the communication (referred above to as TCL) is compared 540 to an expected (or wanted) communication time (referred to above as TR) to determine 550 whether the time delay (referred above to as tk) should be adapted or not. If it is determined that the time delay should be adapted, the time delay is adapted 560 and a new or further control loop may be sent out. It may also be determined 570 that a system parameter should be changed or adapted based on the comparison and if so, changing or adapting the parameter 575 accordingly. A parameter may for example be adapted by adjusting a value of the parameter. A parameter may be changed by replacing the parameter. This may be optional as indicated by the dashed lines.

Based on the comparison it may also be determined that a warning or a shutdown should be effected 580 and if so, shutting down or warning 585 accordingly.

Figure 6:
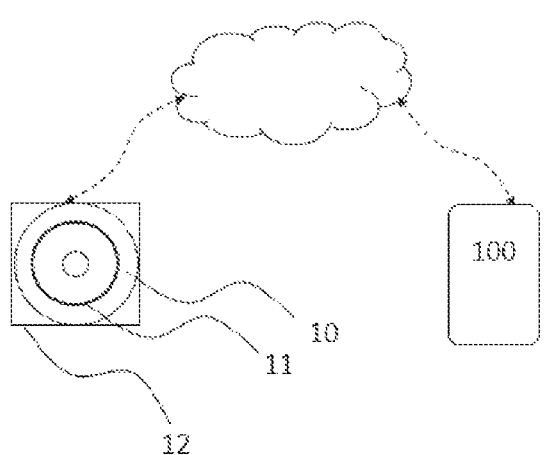
FIG. 6 shows a schematic view of a computer-readable medium according to the teachings herein.

FIG. 6 shows a schematic view of a computer-readable medium as described in the above. The computer-readable medium 60 is in this embodiment a data disc 60. In one embodiment the data disc 60 is a magnetic data storage disc. The data disc 60 is configured to carry instructions 61 that when loaded into a processor arrangement 110, such as a processor such as the controller of the device 100 of FIG. 1, execute a method or procedure according to the embodiments disclosed above. The data disc 60 is arranged to be connected to or within and read by a reading device 62, for loading the instructions into the processor arrangement 110. One such example of a reading device 62 in combination with one (or several) data disc(s) 60 is a hard drive. It should be noted that the computer-readable medium can also be other mediums such as compact discs, digital video discs, flash memories or other memory technologies commonly used. In such an embodiment the data disc 60 is one type of a tangible computer-readable medium 60.

The instructions 61 may also be downloaded to a computer data reading device 100, such as the processor arrangement 110 or other device capable of reading computer coded data on a computer-readable medium, by comprising the instructions 61 in a computer-readable signal which is transmitted via a wireless (or wired) interface (for example via the Internet) to the computer data reading device 100 for loading the instructions 61 into a processor arrangement 110. In such an embodiment the computer-readable signal is one type of a non-tangible computer-readable medium 60. The instructions may be stored in a memory (not shown explicitly in FIG. 6, but referenced 120 in FIG. 1) of the computer data reading device 100.

The instructions comprising the teachings according to the present invention may thus be downloaded or otherwise loaded in to a device 100 in order to cause the device 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for use in a wireless system comprising a control node and at least one field-level device, wherein the method comprises:

monitoring a time for a control loop performed on a recurring basis, the control loop involving wireless communication between the control node and the at least one field level device; and adjusting an intentional delay inserted into the control loop, to regulate the time for the control loop according to a required time, wherein adjusting the intentional delay comprises adjusting the intentional delay to a higher value responsive to the time for the control loop being lower than the required time and adjusting the intentional delay to a lower value responsive to the time for the control loop being higher than the required time.

2. The method according to claim 1, wherein the required time is below an actual time limit for performing the control loop.

3. The method according to claim 1, wherein the time for the control loop unintentionally varies in dependence on interference in a radio frequency environment of the wireless system, and wherein adjusting the intentional delay comprises adjusting the intentional delay in an inverse relationship with unintentional variations in the time for the control loop.

4. The method according to claim 1, wherein the time for the control loop unintentionally varies in dependence on loading of the wireless system, and wherein adjusting the intentional delay comprises adjusting the intentional delay in an inverse relationship with the unintentional variations.

5. The method according to claim 1, further comprising initiating a controlled shutdown of a system associated with the control loop, in response to the intentional delay falling below a defined threshold.

6. The method according to claim 5, wherein the system associated with the control loop is an industrial system whose operation depends on the control loop.

7. The method according to claim 1, further comprising initiating a controlled shutdown of a system associated with the control loop, in response to a rate of change or a step size of adjustments made to the intentional delay exceeding a defined threshold.

8. The method according to claim 1, wherein the intentional delay comprises one or more delays imposed at the control node or the field-level device or both the control node and the field-level device.

9. The method according to claim 8, wherein the one or more delays comprise any one or more of: delaying one or more control messages going between the control node and the field-level device for performance of the control loop, and delaying one or more processing operations at the control node or the field-level node or both, for performance of the control loop.

10. A control node of a wireless system comprising at least one field-level device and the control node, the control node comprising:
a wireless interface configured for communicating with the at least one field-level device; and
processing circuitry configured to:

monitor a time for a control loop performed on a recurring basis, the control loop involving wireless communication between the control node and the at least one field-level device; and adjust an intentional delay inserted into the control loop, to regulate the time for the control loop according to a required time, wherein the processing circuitry is configured to adjust the intentional delay to a higher value responsive to the time for the control loop being lower than the required time and adjust the intentional delay to a lower value responsive to the time for the control loop being higher than the required time.

11. The control node according to claim 10, wherein the required time is below an actual time limit for performing the control loop.

12. The control node according to claim 10, wherein the time for the control loop unintentionally varies in dependence on interference in a radio frequency environment of the wireless system, and wherein the processing circuitry is configured to adjust the intentional delay in an inverse relationship with unintentional variations in the time for the control loop.

13. The control node according to claim 10, wherein the time for the control loop unintentionally varies in dependence on loading of the wireless system, and wherein the processing circuitry is configured to adjust the intentional delay in an inverse relationship with unintentional variations in the time for the control loop.

14. The control node according to claim 10, wherein the processing circuitry is further configured to initiate a controlled shutdown of a system associated with the control loop, in response to the intentional delay falling below a defined threshold.

15. The control node according to claim 14, wherein the system associated with the control loop is an industrial system whose operation depends on the control loop.

16. The control node according to claim 10, wherein the processing circuitry is further configured to initiate a controlled shutdown of a system associated with the control loop, in response to a rate of change or a step size of adjustments made to the intentional delay exceeding a defined threshold.

17. The control node according to claim 10, wherein the intentional delay comprises one or more delays imposed at the control node or the field-level device or both the control node and the field-level device.

18. The control node according to claim 17, wherein the one or more delays comprise any one or more of: delaying one or more control messages going between the control node and the field-level device for performance of the control loop, and delaying one or more processing operations at the control node or the field-level node or both, for performance of the control loop.

* * * * *